United States Patent
Bercovich et al.

(10) Patent No.: US 9,934,450 B2
(45) Date of Patent: *Apr. 3, 2018

(54) SYSTEM AND METHOD FOR CREATING A COLLECTION OF IMAGES

(71) Applicant: Shutterfly, Inc., Redwood City, CA (US)

(72) Inventors: Moshe Bercovich, Haifa (IL); Alexander M. Kenis, Kiryat Motzkin (IL); Eran Cohen, Haifa (IL)

(73) Assignee: Shutterfly, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/817,658

(22) Filed: Aug. 4, 2015

(65) Prior Publication Data

US 2015/0339542 A1 Nov. 26, 2015

Related U.S. Application Data

(63) Continuation of application No. 14/482,695, filed on Sep. 10, 2014, now Pat. No. 9,111,178, which is a (Continued)

(51) Int. Cl.
*G06K 9/32* (2006.01)
*G06K 9/54* (2006.01)
(Continued)

(52) U.S. Cl.
CPC ....... *G06K 9/6221* (2013.01); *G06F 17/3028* (2013.01); *G06F 17/30244* (2013.01);
(Continued)

(58) Field of Classification Search
None
See application file for complete search history.

(56) References Cited

U.S. PATENT DOCUMENTS

| | | | |
|---|---|---|---|
| 2006/0104520 A1* | 5/2006 | Kraus | G06F 17/30265 382/225 |
| 2006/0126944 A1* | 6/2006 | Loui | G06F 17/3025 382/224 |

(Continued)

*Primary Examiner* — Vu Le
*Assistant Examiner* — Guillermo Rivera-Martinez
(74) *Attorney, Agent, or Firm* — Xin Wen

(57) ABSTRACT

System and method for creating a collection of images are described, the method comprising: receiving images from at least one source of images; processing the images to produce an output collection of images, the processing comprising grouping the images to clusters of related images and selecting the preferred images in the clusters; and outputting the output collection of images, the output collection of images comprising the clusters of related images and indication of the preferred images in the clusters. The system for creating a collection of images comprising: a storage medium to receive images from at least one source of images; a processor to produce an output collection of images by grouping the images to clusters of related images and selecting the preferred images in the clusters; and a collection output medium for outputting the output collection of images.

18 Claims, 4 Drawing Sheets

Related U.S. Application Data continuation of application No. 13/520,325, filed as application No. PCT/IL2011/000167 on Feb. 17, 2011, now Pat. No. 8,861,897.

(60) Provisional application No. 61/305,157, filed on Feb. 17, 2010.

(51) Int. Cl.
*G06K 9/60* (2006.01)
*G06K 9/62* (2006.01)
*G06F 17/30* (2006.01)

(52) U.S. Cl.
CPC .. *G06F 17/30268* (2013.01); *G06F 17/30598* (2013.01); *G06K 9/6267* (2013.01)

(56) References Cited

U.S. PATENT DOCUMENTS

| | | | |
|---|---|---|---|
| 2007/0115373 A1* | 5/2007 | Gallagher | G06F 17/30265 348/231.3 |
| 2008/0089592 A1* | 4/2008 | Isomura | G06T 11/60 382/224 |

* cited by examiner

SYSTEM AND METHOD FOR CREATING A COLLECTION OF IMAGES

CLAIM TO PRIORITY

The present application is a continuation application of and claims priority to U.S. application Ser. No. 13/520,325, entitled "System and method for creating a collection of images" by the same inventors, filed on Jul. 2, 2012, which is a national-entry application based on and claims priority to PCT Patent Application PCT/IL2011/000167, entitled "System and method for creating a collection of images" by the same inventors, filed on Feb. 17, 2011, which claims priority to U.S. Provisional Application No. 61/305,157, filed on Feb. 17, 2010. The content of these applications is incorporated herein by reference.

BACKGROUND OF THE INVENTION

Since digital cameras took the lead in the photography market, many users have problems in managing the huge amount of images stored on their computers, storage devices and/or online collections of images. The occasionally captured images are aggregated in the various storage forms and occupy considerable storage volume, while the amount of stored images complicates and reduces the ability to find of a certain photo among the huge amount of photos. Therefore, the process of selection of images among the huge amount of stored images, for example for printing or for producing an album or specific collection of images for sharing online, may be complicated, wearying and time consuming.

There are known methods for ranking images, such as ranking according to optical quality of images or ranking according to popularity of the images.

Additionally, there are known methods for identifying and clustering related images, for example for creating batches of images related to a certain event or period of time.

The known methods for ranking and for clustering sets of images may facilitate the management of image collections.

However, there is still need for a system and method which may automatically or semi-automatically create organized collections of selected images out of an occasional aggregation of stored images.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
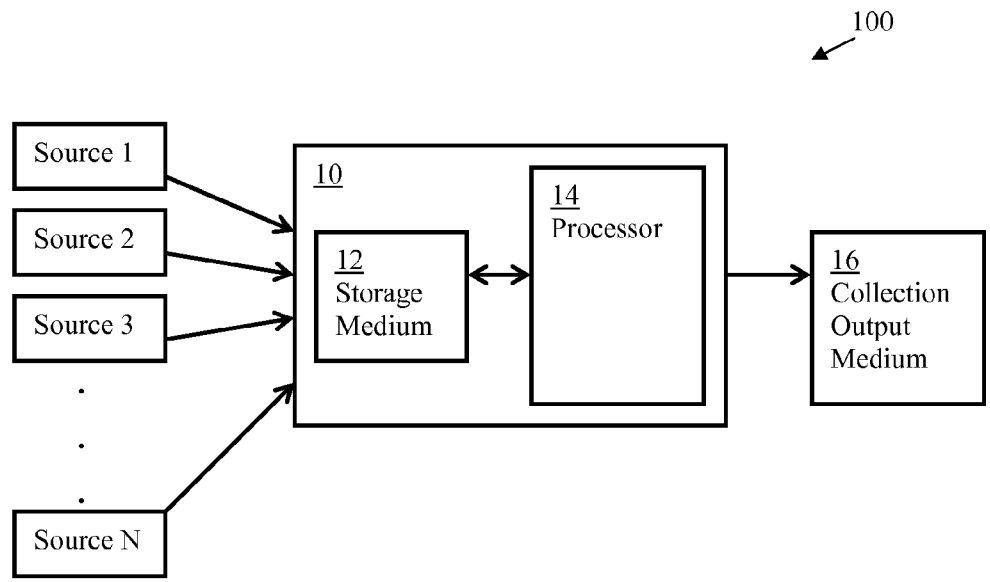
FIG. 1 is a schematic illustration of a system for creating a collection of images according to embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Reference is now made to FIG. 1, which is a schematic illustration of a system 100 for creating a collection of images according to embodiments of the present invention. System 100 may include image management server 10, which may include a storage medium 12 and a processor 14. The image management server 10 can receive images from at least one source of images of any number of various sources 1 to N. The received images may be stored in the storage medium 12. The various sources 1 to N may include, for example, mobile or stationary storage devices, personal computers, digital cameras, mobile devices such as mobile phones or tablets, online sharing websites and/or any other source or device having images stored in any supported digital format thereon. The storage medium 12 may include any non-transitory computer-readable data storage media, wherein the term non-transitory computer-readable media includes all computer-readable media except for a transitory, propagating signal. The uploading of images from various sources 1 to N to the storage medium 12 may be performed by, for example, dedicated software installed on various sources 1 to N. In some embodiments of the present invention, the dedicated software may upload images to the image management server 10 automatically or upon request by a user. For example, the dedicated software may automatically upload all the images stored on the respective device. In some embodiments, once the dedicated software is installed on a device, every image, once stored on the device, is automatically uploaded to the image management server 10. In some embodiments of the present invention, a digital camera may have dedicated software installed thereon, which may upload photos, for example, directly to the image management server 10, by wireless connection (such as Wi-Fi connection or another form of wireless connection), automatically or upon request by a user. Similarly, in some embodiments of the present invention, mobile devices such as mobile phones or tablets may have dedicated software applications installed thereon. Additionally, in some embodiments of the present invention, image management server 10 may interface with online photo sharing websites for uploading into the image management server 10 images stored on the websites. In some embodiments of the present invention, the dedicated software, applications and/or interfaces mentioned above may reduce the size of the uploaded images for expediting the upload and for reducing the volume occupied by the images stored in the storage medium 12.

A user's images stored in the storage medium 12 may be processed by the processor 14, which may output the images classified to clusters of related images and/or to chapters of related images, each chapter may include several clusters of related images, and the best and/or preferred images within each cluster may be indicated. The resulting output collection of images, which may include the classified clusters, chapters and/or indication of best/preferred images, may be outputted to a collection output medium 16, which may include, for example, directories of a local hard drive and/or another mass-storage device, for example, of a user's personal computer, online automated image printing services, offline image printing services such as photo printing services in retail stores, online photo sharing services/platforms, digital photo frames and/or any other suitable output medium.

Figure 2:
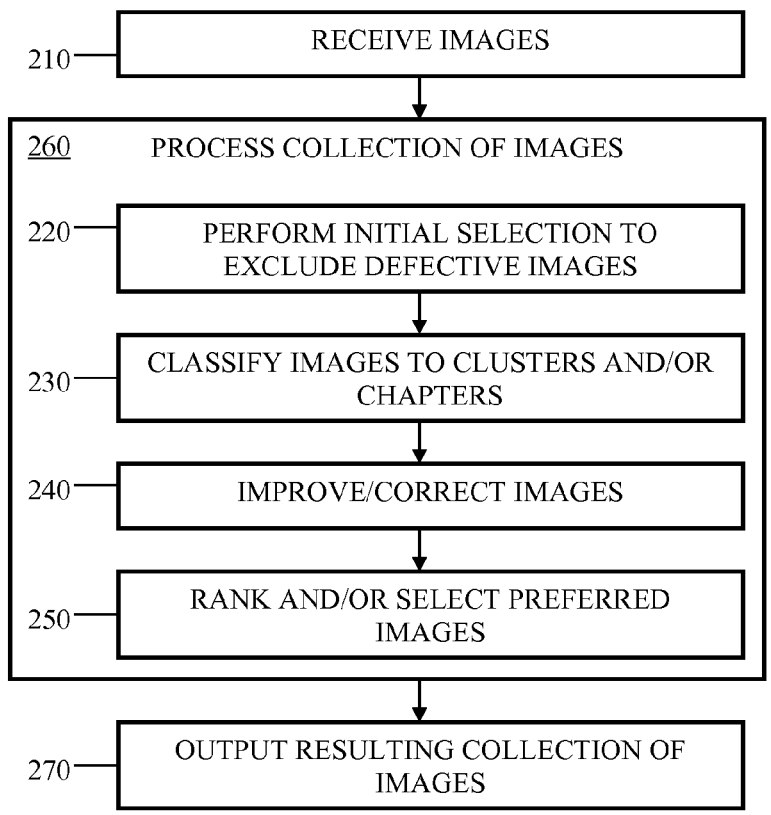
FIG. 2 is a schematic flowchart illustrating a method for creating a collection of images by system described above, according to some embodiments of the present invention.

Reference is now made to FIG. 2, which is a schematic flowchart illustrating a method for creating a collection of images by the system 100 described above, according to some embodiments of the present invention. As indicated in block 210, the method may include receiving images, for example, from at least one of various sources 1 to N. The received images may be stored in the storage medium 12, as described in detail above.

As indicated in block 260, the method may include processing the collection of images, for example by the processor 14. As indicated in block 220, the processing by the processor 14 may include initial selection in order to exclude defected images such as, for example, corrupted images and/or images under a certain threshold of optical quality parameters. Then, the processor 14 may create the output collection of images by classifying the images into clusters and/or chapters and/or by indicating the best/preferred images in each cluster. First, as indicated in block 230, the processor 14 may classify images into clusters and/or chapters. For clustering and/or chaptering the images, the processor 14 may use statistical analyses (such as, for example histogram analyses) along with other tools such as, for example, computer vision technologies, face detection, face recognition, object detection, object recognition and other technical analysis methods in order to make successful image classifications.

Classification of images to clusters of related images may be performed based on a combination of parameters, which may include parameters from the following non-exhaustive list: time of capture, location of capture, colors, recognized identity of people in the image, number of people, location(s) of people/objects in the image and recognized objects in the image. The classification may be based on a certain hierarchy of the involved parameters, which may be decided by the processor 14 and/or dictated, fully or partially, by a user.

The classified clusters of related images may, for example, facilitate better organized viewing of an image collection, may constitute a basis for easier and/or more effective selection of best/preferred images and/or may constitute a basis for automated design of pages and/or albums.

Then, as indicated in block 250, the processor 14 may automatically select the best/preferred images, with or without user's input, and/or automatically rank the images and/or clusters according to various criterions that may, for example, be adjusted by a user, as described in detail herein below with reference to FIG. 6.

Additionally, as indicated in block 240, before and/or after selection of best/preferred images, the processor 14 may perform image corrections and/or improvements such as, for example, contrast and brightness enhancement, gamma corrections, etc., which may be performed using properties of the complete picture, such as, for example, intensity, color histogram and/or according to any method known in the art. According to some embodiments of the present invention, the image processing for correction/improvement may focus mainly on certain parts of the image such as on faces, people or certain objects, and may include, for example, improvements to the contrast, brightness, colors and/or focus. Additionally, according to some embodiments of the present invention, the correction/improvement process may include cropping of images, for example, in order to make the main object(s) and/or person(s) more noticeable and/or centered in the image. For example, an image may be cropped to produce a portrait image of a face/person/object, with or without some area around the face/person/object, or to produce a full or half body image. In another example, an image may be cropped to remove dead zones and/or excessive edges of the image, so that, for example, a main portion of the image is centered or located in a noticeable portion of the image, such as, for example, one of the "golden ratio" positions or "rule of thirds" positions known in the art.

As indicated in block 270, the resulting output collection of images, which may include the classified clusters, chapters and/or indication of best/preferred images, may be outputted to a collection output medium 16. Collection output medium 16 may print the output collection of images and/or produce printed, electronic and/or online albums and/or photo books based on the output collection of images.

Figure 3:
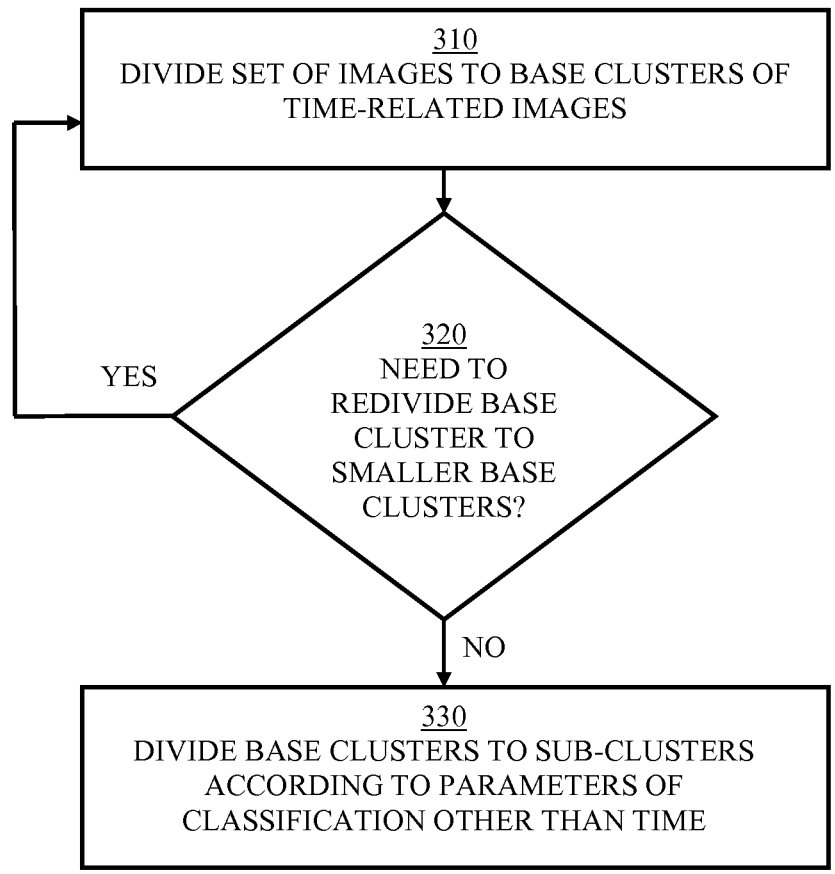
FIG. 3 is a schematic flowchart illustrating a method for clustering images based on time-hierarchy, according to embodiments of the present invention.

In some embodiments of the present invention, the classification of images into clusters may be based on a time hierarchy clustering according to embodiments of the present invention, as described in detail herein below. Reference is now made to FIG. 3, which is a schematic flowchart illustrating a method for clustering images based on time-hierarchy, according to embodiments of the present invention.

In a time hierarchy clustering according to embodiments of the present invention, as indicated in block 310, the images may be first clustered to groups of successively captured images according to the time differences between the capture times of successive images, to create base clusters of time-related images. For example, a set of images taken in relatively high rate after and/or before a long cease (for example, relative to the high rate) may be grouped into a base cluster of time-related images.

For example, in a batch of images, a series of successive images may have relatively small time difference between the capture times of each two successive images, and relatively large time difference between the capture time of the last image in the series of successive images and the capture time of the next image that comes after the series of successive images. In this case, the series of successive images may be classified in a base cluster of time-related images. The next image that comes after the series of successive images may, for example, belong to another base cluster of time-related images or, in some cases, be isolated time-wise and/or constitute a base cluster of one image. The determination of which time differences are relatively small and which time differences are relatively large may be performed by statistical analysis, which may be performed, for example, by the processor 14. The differentiation between small and large time differences may be different for different batches of images and/or for different portions of batches of images, for example, according to particular statistical analyses.

For example, for a set of images, the largest time differences can be found. For example, the largest time differences can be defined as the time differences dT in the range $A*dTmax<dT<dTmax$, wherein dTmax is the maximal time difference in the set of images and A is a constant factor between 0 to 1. In most cases, the value of A may be set between 0.3 and 0.8, and may be determined by trial and error and/or by machine learning, in order to find for a specific case the value of A which enables finding the most effective time differences range defined above. In typical cases, the preferred value of A may be set to about 0.6, for example, as default number. Then, the mean time difference value B in the range of largest time differences and the standard deviation S can be determined. Accordingly, the range of largest time differences can be redefined as $B-M*S<dT<B+M*S$, or more accurately as $B-M*S<dT<dTmax$, wherein M is constant factor between 1 to 3, which may be determined by trial and error and/or by machine learning, in order to find for a specific case the value of M which enables finding the most effective time differences range. In typical cases, the preferred value of M may be set to about 1.5, for example, as default number. lThe time differences in this redefined range are used as cluster splitters, i.e. time differences that separate between clusters of time-related images.

As indicated in block 320, if required, a base cluster of time-related images may be further divided to smaller time-related base clusters, for example, according to more particular statistical analyses. For example, if there are changes in image capturing rate within a base cluster, a particular statistical analysis may identify, within the base cluster, a set of images taken in relatively high rate, i.e. small time differences between the images in the set, after and/or before a long cease (for example, long relative to the short time differences between images in the set), which may be grouped into a smaller base cluster of time-related images. For example, if the number of images in a base cluster is larger than a certain predetermined number, for example, 15 images, the statistical calculation described above may be repeated for this base cluster to further divide the base cluster to smaller base clusters of time related images. In another example, if the maximal time difference between two images in this base cluster is larger than a certain predefined threshold value, for example, 1800 seconds, the statistical calculation described above may be repeated for this base cluster to further divide the base cluster to smaller base clusters of time related images.

Further according to some embodiments of the present invention, as indicated in block 330, a base cluster of time-related images may be further divided to sub-clusters according to parameters of classification other than time, such as the parameters of classification mentioned above with reference to FIG. 2. The classifications may be based, for example, on image analysis and processing abilities of the processor 14, which may include color analysis and/or comparisons in various color spaces, object recognition, face recognition, and other measurements, calculations and analysis abilities. The image analysis and processing abilities of the processor 14 may enable recognition of parameters such as, for example, locations, people, faces, objects, orientations (of, for example, people, faces and/or objects), color distributions and/or patterns in the image, and/or calculations of parameters such as, for example, number of people and/or number of recognized objects in the image. The recognized and/or calculated parameters may be used for classifying the images into clusters and/or chapters.

For example, images which are greatly similar, for example with difference below a certain determined threshold in various parameters of the image, may be grouped in a sub-cluster. In another example, images which include the same people may be grouped in a sub-cluster. According to some preferences, for example, of a user and/or automatic preferences, images which have all the people/objects in common or some of the people/objects in common or, for example, above a certain number of people/objects in common may be grouped in a sub-cluster. Further sub-clustering may be performed, for example, based on number of people present in the picture, a certain person or persons present in the images (for example, dominant, central and/or main people according to automatic recognition and/or user preferences), presence of a main object or objects (according to automatic recognition and/or user preferences) and/or based on the locations and/or directions in which the images are captured.

Figure 4:
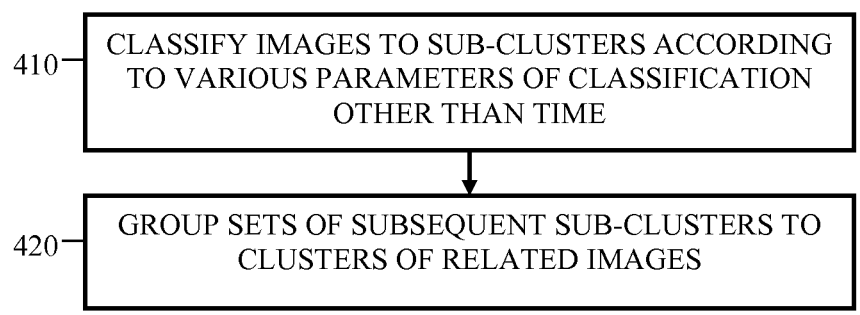
FIG. 4 is a schematic flowchart illustrating a method for clustering images with no capture time metadata, according to embodiments of the present invention.

For images with unknown time of capture, for example images with no capture time metadata, the classification of images into clusters according to embodiments of the present invention may be based on other parameters, and based on the assumption that the images are ordered chronologically, i.e. according to the time of capture. According to embodiments of the present invention, the images may be first classified to sub-clusters according to various parameters, and then sets of subsequent sub-clusters may be grouped to clusters of related images, for example, according to average color analysis. Reference is now made to FIG. 4, which is a schematic flowchart illustrating a method for clustering images with no capture time metadata, according to embodiments of the present invention. As indicated in block 410, the images may be classified to sub-clusters according to various parameters of classification other than time, similarly to the classification to sub-clusters described in detail above with reference to block 330 in FIG. 3. For example, based on image analyses by processor 14, a topological space of various image parameters as detailed above may be calculated, and the topological distance between subsequent images may be calculated, based on differences in parameters between subsequent images. Separation between sub-clusters of images may be performed where the topological distance between subsequent images is larger than a certain determined threshold. The determination of the threshold may be performed by statistical analysis, which may be performed, for example, by processor 14. The threshold may be different for different batches of images and/or for different portions of batches of images, for example, according to particular statistical analyses. Then, as indicated in block 420, sets of subsequent sub-clusters may be grouped to clusters of related images, for example, according to average color analysis. For example, the average color analysis of several subsequent sub-clusters may be compared, and subsequent sub-clusters with similar average color, for example, with difference in average color below a certain threshold, may be grouped to a cluster of related images. Additionally or alternatively, the sub-clusters may be grouped to clusters of certain size or up to a certain size. For example, the sub-clusters may be grouped to clusters of between 10 to 15 images, or, for example, clusters of up to 15 images.

The clusters obtained by the processes described above can be grouped to chapters of related clusters. In some exemplary embodiments of the present invention, a large cluster of time-related images, obtained as described above with reference to block 310 in FIG. 3, may be defined as a chapter, for example if it includes more than a predetermined number of images. Additionally or alternatively, clusters may be arbitrarily grouped into chapters, wherein each chapter includes images from a different period of time, for example a different month, and/or a different geographical location.

Figure 5:
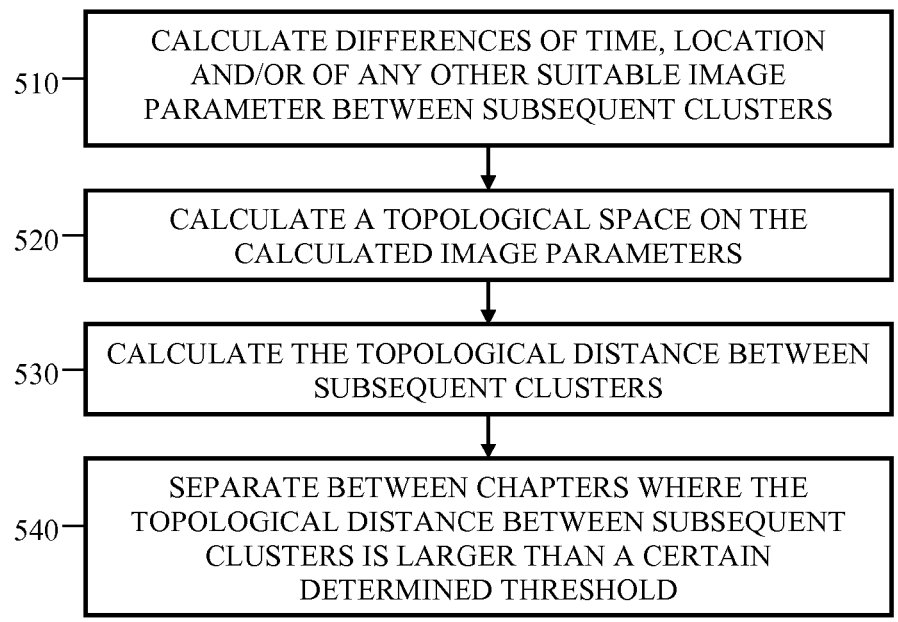
FIG. 5 is a schematic flowchart illustrating a method for grouping clusters into chapters according to various differences in parameters, according to embodiments of the present invention.

Additionally or alternatively, in some embodiments of the present invention, the clusters of related images obtained by the processes described above can be grouped to chapters, for example, according to time and/or location criterions, preferably time and location criterions combined together, which may, for example, relate the groups of clusters to an event and/or scene in which the images were taken. Reference is now made to FIG. 5, which is a schematic flowchart illustrating a method for grouping clusters into chapters according to various differences in parameters, such as differences in time and/or location of capture, according to embodiments of the present invention. The chapters may be created using information about parameters of each image, for example time and location (for example, GPS data) metadata of each image and/or information about time, location of capture and/or other parameters obtained from other sources. Each of the created chapters may include clusters of images which are relatively similar in time, location and/or any other suitable parameter. As indicated in block 510, the method may include calculation of differences of time (in time units), location (in distance units) and/or of any other suitable parameter between subsequent clusters. As indicated in block 520, the method may include calculation of a topological space based on the calculated image parameters, i.e. multi-dimensional curve that indicates, for example, time differences versus geographical differences between subsequent clusters and optionally versus additional/alternative variables such as, for example, differences of average color and/or differences of identity and/or number and/or locations of photographed people. For example, histograms of time difference, location difference, and/or other variable differences between subsequent clusters may be calculated, based on which the topological space may be obtained.

The topological distance between subsequent clusters along the topological space may indicate the combined dissimilarity between the clusters, taking into account all the variables that constitute the topological space. A larger topological distance between subsequent clusters may indicate a larger combined dissimilarity between the clusters. As indicated in block 530, the method may include calculating the topological distance between subsequent clusters, based on the calculated differences in parameters. As indicated in block 540, the method may include separating between chapters where the topological distance between subsequent clusters is larger than a certain determined threshold. The determination of the threshold may be performed by statistical analysis, which may be performed, for example, by the processor 14. The threshold may be different for different batches of clusters and/or for different portions of batches of clusters, for example, according to particular statistical analyses.

The separation into chapters may be performed in addition to separation according to time periods. For example, the clusters may be separated according to different months or days, and the clusters in each month or day may be separated into chapters. Additionally or alternatively, each chapter may be further divided according to time periods, for example, to separate day chapters, hour chapters, and/or other similar divisions.

Additionally, according to some embodiments of the invention, image management server 10 may output a suggested name tag for each chapter based on analysis of the chapter's content, and further based on previous name tags and/or naming conventions used by the present or optionally other users of server 10. For example, memory 12 may have stored thereon a data base of name tags and naming conventions used by users of server 10, which may be used by the processor 14 for determining name tags for the separate chapters. For example, the processor 14 may identify the locations, people, conditions and/or objects photographed in images of a certain chapter, and look in the data base for name tags and/or conventions used for the same and/or similar locations, people, conditions and/or objects.

According to some embodiments of the present invention the separation into clusters and/or chapters and/or the naming of the chapters may be adjusted and/or changed by the user.

As mentioned above with reference to FIG. 2, the output collection of images outputted by image management server 10 may include indication of the preferred images in a cluster, for example based on ranking and/or selection performed by the processor 14. The processor 14 may rank each photo in a cluster according to various parameters, for example in order to imitate human ranking of images, possibly by a self learning process for image ranking. The processor 14 may rank the photos based on various criteria, which may relate, for example, to photographed objects/people of interest, optical and/or composition quality of the image and/or the user's profile and/or preferences.

Figure 6:
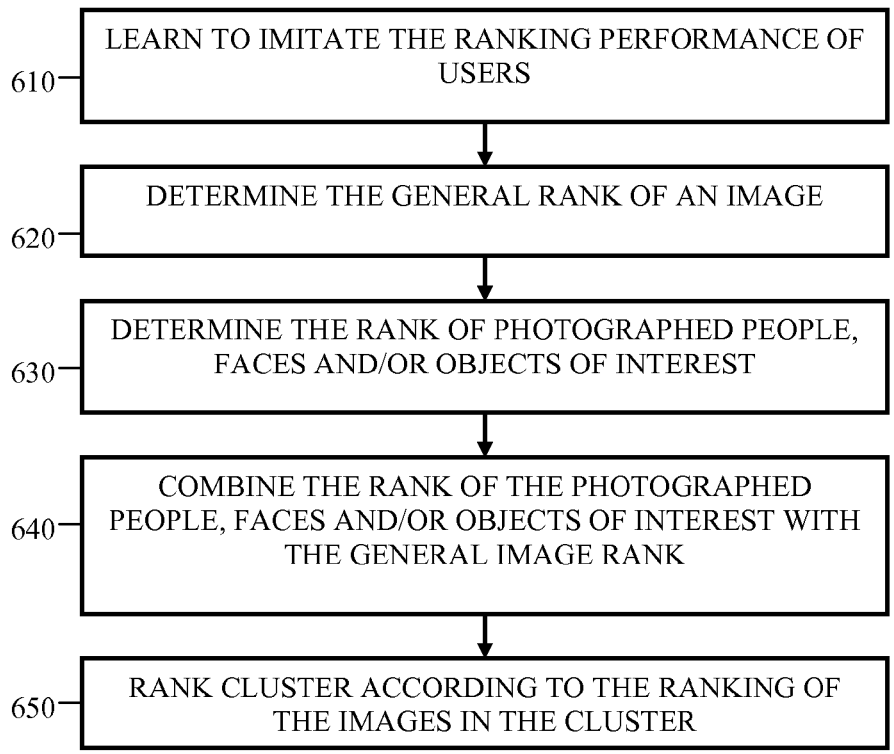
FIG. 6 is a schematic flowchart illustrating a method for image ranking within a cluster of images according to embodiments of the present invention.

Reference is now made to FIG. 6, which is a schematic flowchart illustrating a method for image ranking within a cluster of images according to embodiments of the present invention. In some embodiments of the present invention, storage medium 12 may have stored thereon a database of previous rankings of the present user (i.e. the user that uploaded the currently processed images) and/or of other users of server 10. In order to determine the rank of an image, the processor 14 may use the previous rankings of images with similar properties. As indicated in block 610, the processor 14 may learn to imitate the ranking performance of users. In the beginning of the ranking process, the processor 14 may receive a few ranks of images in a cluster from the present user, for example, in real time and/or pre-uploaded ranks, in order to learn the user's preferences. Based on the ranks received from the present user and the previous stored rankings, processor 14 may learn to imitate the ranking performed the various users and especially the ranking preferences of the present user. The more the present user provides rankings of images, the better processor 14 may imitate the ranking preferences of the present user. For example, the processor 14 may ascribe higher weight to the present user's rankings than to rankings of other users.

As indicated in block 620, the processor 14 may determine the general rank of an image. The processor 14 may rank the images based on parameters relating to general optical and/or composition quality of the image, such as, for example, parameters relating to focus, illumination, color, noise, location of the objects/people on the image, harmonization, composition and/or any other related parameters. Additionally, the images may be ranked according to preferences such as number of people/objects/faces in the image, colors, brightness and/or any other suitable preferences.

Additionally, as indicated in block 630, the processor 14 may determine the rank of photographed people, faces and/or objects of interest. The processor 14 may identify objects and/or people of interest in the images, for example based on identification of objects and/or people in salient regions of the image or by any other suitable method. After identifying the main objects and/or people of interest, the processor 14 may rank the images based on, for example, parameters relating to the optical quality of the relevant regions in the image, for example, such as focus, illumination, color, noise and/or any other related parameters, and/or parameters relating to the noticeability of the objects/people of interest in the image, for example, such as location of the objects/people on the image, harmonization, composition and/or any other related parameters. Additionally, in case the image includes people and/or faces, parameters relating to the people/faces may be used for ranking, such as, for example, the people/faces poses, expressions, haircuts, beauty (for example based on symmetry, golden ratios, etc.), orientations, visibility, locations, and/or any other suitable parameter. In some embodiment of the present invention, the people, faces and/or objects of interest may be ranked separately and then, for example, the rank of the photographed people, faces and/or objects may be combined with the general image ranking, as indicated in block 640.

Additionally, as indicated in block 650, according to some embodiments of the present invention, the clusters/sub-clusters may also be ranked, for example, according to the ranking of the images in the cluster/sub-cluster (for example, based on the ranking of the best-ranked image, the number of images with rank above a certain threshold and/or average ranking of the images in the cluster/sub-cluster), the size of the cluster and/or of sub-clusters, the required type of output collection of images and/or any other suitable parameter. The processor 14 and/or the user may adjust the selection and/or viewing of images based on the ranking of the clusters/sub-clusters, such as, for example, more images from a higher ranked cluster/sub-cluster may be selected and/or viewed.

Figure 7:
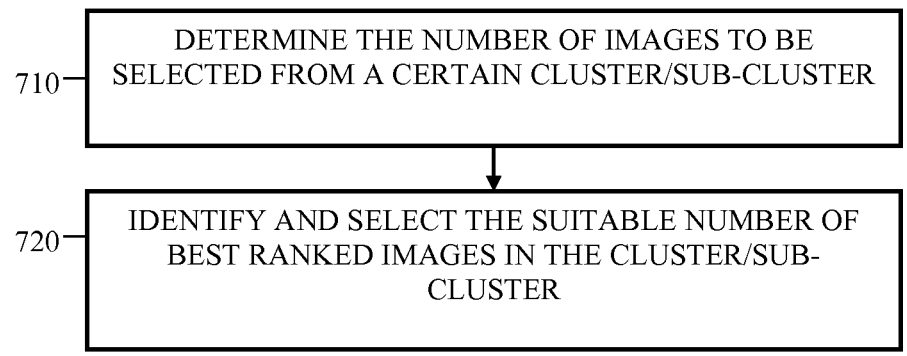
FIG. 7 is a flowchart illustrating a method for image selection from clusters according to embodiments of the present invention.

Based on rankings of the images, the best and/or most preferred images may be selected by the processor 14 for the output collection outputted by image management server 10. Reference is now made to FIG. 7, which is a flowchart illustrating a method for image selection from clusters according to embodiments of the present invention. As indicated in block 710, the method may include determining by the processor 14 the number of images to be selected from a certain cluster/sub-cluster. The processor 14 may select for example, the best-ranked image from each cluster and/or sub-cluster, or a predetermine number of best ranked images from each cluster and/or sub-cluster, or all the images with a rank above a certain determined threshold. In some embodiments, in case the cluster/sub-cluster includes very similar images, the processor 14 may decide to select just one image, i.e. the best-ranked image in the cluster/sub-cluster, for example in case the rank of the best-ranked image in the cluster/sub-cluster is above a determined threshold.

Additionally, in some embodiment of the present invention, the number of selected images from a cluster/sub-cluster may be influenced by the user's input which may be entered, for example, in real time and/or at the time of uploading the images or at any other suitable time. For example, the user may indicate the number of images required from a certain cluster/sub-cluster, for example, according to the content of the images in the certain cluster/sub-cluster and/or the ranking of the certain cluster/sub-cluster. Additionally or alternatively, the user may indicate that images which include certain indicated people and/or objects of interest should be printed more preferably, for example in case the rank of the image is above a determined threshold.

In various embodiments of the present invention, other rules to determine the number of selected best images may be executed. In one exemplary embodiment, in case a cluster/sub-cluster includes images with the same people in different poses and/or head poses, a third of the number of images in the sub-cluster may be selected, for example as long as the rank of this number of best-ranked images in the cluster/sub-cluster is above a determined threshold. In another example, in case the cluster/sub-cluster includes images which are closely time-related, a fourth of the number of images in the sub-cluster may be selected, for example as long as the rank of this number of best-ranked images in the cluster/sub-cluster is above a determined threshold.

As indicated in block 720, according to the determination of the number of images to be selected, the processor 14 may identify and select the suitable number of best ranked images in the cluster/sub-cluster.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A computer implemented method for grouping and selecting images, comprising:
   determining capture times of a set of images;
   chronologically ordering the images in the set of images;
   calculating capture time differences dT between capture times of successive images in the set of chronologically ordered images by a computer processor;
   automatically determining a cluster-splitter range of time differences by the computer processor using the capture time differences dT in the set of chronologically ordered images;
   automatically dividing a plurality of images by the computer processor, based on the cluster-splitter range of time differences, into multiple base clusters each comprising successive images; and
   automatically dividing one of the multiple base clusters into multiple sub-clusters of image if two successive images in the one of the multiple base clusters have a capture time difference that is larger than a predefined threshold value.

2. The computer implemented method of claim 1, wherein the step of automatically determining a cluster-splitter range of time differences comprises:
   identifying a maximum capture time difference dTmax by the computer processor in the capture time differences dT between successive images in the set of images; and
   automatically determining the cluster-splitter range of time differences at least in part based on the maximum capture time difference dTmax.

3. The computer implemented method of claim 2, wherein the step of determining a cluster-splitter range of time differences comprises:

identifying, in the set of images, capture time differences dT that are within a range between A*dTmax and dTmax, wherein A is a constant factor between 0 and 1; and automatically calculating a standard deviation S of the capture time differences dT that are within a range between A*dTmax and dTmax, wherein the cluster-splitter range of time differences in part based on the standard deviation S of the capture time differences dT that are within a range between A*dTmax and dTmax.

4. The computer implemented method of claim 3, wherein A is between 0.3 and 0.8.

5. The computer implemented method of claim 3, wherein the step of determining a cluster-splitter range of time differences comprises:

automatically calculating a mean capture time difference B for the capture time differences dT that are within a range between A*dTmax and dTmax, wherein the cluster-splitter range of time differences is defined between B−M*S and dTmax, wherein M is a constant factor between 1 and 3.

6. The computer implemented method of claim 1, wherein successive base clusters in the multiple of base clusters are separated by capture time differences in the cluster-splitter range of time differences.

7. The computer implemented method of claim 1, wherein image capture time differences be successive images in each of the base clusters are smaller compared to capture time differences between successive base clusters.

8. The computer implemented method of claim 1, further comprising:

automatically dividing one of the multiple base clusters into multiple sub-clusters of image if the one of the multiple base clusters includes more than a predetermined number of images.

9. The computer implemented method of claim 1, further comprising:

calculating differences between at least two successive base clusters; and grouping the two successive base clusters into a chapter if the difference is smaller than a predetermined threshold.

10. The computer implemented method of claim 1, further comprising:

ranking images in at least one of the base clusters to produce image ranks; and selecting images in the one of the base clusters.

11. The computer implemented method of claim 10, further comprising:

ranking the multiple base clusters at least in part based on the image ranks in the respective base clusters.

12. The computer implemented method of claim 1, wherein the step of automatically determining a cluster-splitter range of time differences comprises:

calculating a standard deviation S of the capture time differences dT in at least a portion of the set of images by the computer processor; and automatically determining the cluster-splitter range of time differences at least in part based on the standard deviation S.

13. The computer implemented method of claim 12, wherein the step of automatically determining a cluster-splitter range of time differences comprises:

identifying a maximum capture time difference dTmax by the computer processor in the capture time differences dT between successive images in the set of images; and automatically identifying, in the set of images, capture time differences dT that are within a range between A*dTmax and dTmax, wherein A is a constant factor between 0 and 1, wherein the standard deviation S is calculated using the capture time differences dT that are within a range between A*dTmax and dTmax.

14. The computer implemented method of claim 13, wherein the step of determining a cluster-splitter range of time differences comprises:

automatically calculating a mean capture time difference B for the capture time differences dT that are within a range between A*dTmax and dTmax by the computer processor, wherein the cluster-splitter range of time differences is defined between B−M*S and dTmax, wherein M is a constant factor between 1 and 3.

15. The computer implemented method of claim 12, further comprising:

ranking images in at least one of the base clusters to produce image ranks; and selecting images in the one of the base clusters.

16. The computer implemented method of claim 1, wherein the step of automatically determining a cluster-splitter range of time differences comprises:

calculating a mean capture time difference B for at least a portion of the set of images by the computer processor; and automatically determining the cluster-splitter range of time differences at least in part based on the mean capture time difference B.

17. The computer implemented method of claim 16, wherein the step of automatically determining a cluster-splitter range of time differences comprises:

identifying a maximum capture time difference dTmax in the capture time differences dT between successive images in the set of images by the computer processor;

identifying by the computer processor, in the set of images, capture time differences dT that are within a range between A*dTmax and dTmax, wherein A is a constant factor between 0 and 1; and automatically calculating a standard deviation S of the capture time differences dT that are within a range between A*dTmax and dTmax.

18. The computer implemented method of claim 17, wherein the mean capture time difference B is calculated for the capture time differences dT that are within a range between A*dTmax and dTmax, wherein the cluster-splitter range of time differences is defined between B−M*S and dTmax, wherein M is a constant factor between 1 and 3.

* * * * *